(12) United States Patent
Dai et al.

(10) Patent No.: US 8,743,899 B2
(45) Date of Patent: Jun. 3, 2014

(54) METHOD FOR SENDING THE PHYSICAL BROADCAST CHANNEL IN A TIME DIVISION DUPLEX SYSTEM

(75) Inventors: Bo Dai, Shenzhen (CN); Shuqiang Xia, Shenzhen (CN); Chunli Liang, Shenzhen (CN); Peng Hao, Shenzhen (CN); Guanghui Yu, Shenzhen (CN); Liujun Hu, Shenzhen (CN); Bin Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 581 days.

(21) Appl. No.: 12/934,976

(22) PCT Filed: Oct. 17, 2008

(86) PCT No.: PCT/CN2008/072747
§ 371 (c)(1),
(2), (4) Date: Sep. 27, 2010

(87) PCT Pub. No.: WO2009/065333
PCT Pub. Date: May 28, 2009

(65) Prior Publication Data
US 2011/0096702 A1    Apr. 28, 2011

(30) Foreign Application Priority Data

Nov. 12, 2007    (CN) .......................... 2007 1 0186456

(51) Int. Cl.
*H04J 4/00*    (2006.01)
*H04L 5/00*    (2006.01)

(52) U.S. Cl.
CPC ............ *H04L 5/0007* (2013.01); *H04L 5/0053* (2013.01); *H04L 5/001* (2013.01); *H04L 5/0048* (2013.01); *H04L 5/005* (2013.01); *H04L 5/0051* (2013.01)

USPC .......................................................... 370/436

(58) Field of Classification Search
CPC ..... H04L 5/0007; H04L 5/001; H04L 5/0048; H04L 5/0053; H04L 5/005; H04L 5/0051
USPC ......... 370/203–211, 330, 336–337, 343–345, 370/436, 442, 480, 498
See application file for complete search history.

(56) References Cited

U.S. PATENT DOCUMENTS

2006/0285483 A1 * 12/2006 Khan ............................ 370/208
2008/0039133 A1 *  2/2008 Ma et al. ..................... 455/552.1
2009/0046672 A1 *  2/2009 Malladi et al. ................. 370/336

FOREIGN PATENT DOCUMENTS

CN    101043255 A    9/2007
CN    101047685 A    10/2007

(Continued)

OTHER PUBLICATIONS

"3GPP TSG RAN1 #49-bis, AGenda item 5.3", Jun. 2007.*

(Continued)

*Primary Examiner* — Mark Rinehart
*Assistant Examiner* — Peter Cheng
(74) *Attorney, Agent, or Firm* — Hultquist, PLLC; Steven J. Hultquist; Mary B. Grant

(57) ABSTRACT

A method for sending a physical broadcast channel in the TDD system is disclosed, which is: a signal of a physical broadcast channel is not sent in a pilot position, and the signal of the physical broadcast channel is sent on 4 OFDM symbols of the first subframe of one radio frame. Through the present invention, the extension requirement of the physical broadcast channel capacity in the TDD can be met, and the system complexity is reduced due to the normal cyclic prefix and extended prefix using the same sending method.

3 Claims, 12 Drawing Sheets

(56) References Cited

FOREIGN PATENT DOCUMENTS

| CN | 101159488 A | 4/2008 |
|---|---|---|
| EP | 2221994 A1 | 8/2010 |

OTHER PUBLICATIONS

3GPP TR 25.814 v7.1.0, "3rd Generation Partnership Project: Technical Specification Group Radio Access Network", Sep. 2006, pp. 1-132.

Nokia Siemens Networks, "3GPP TSG RAN WG1 No. 51 Meeting R1-074861", Nov. 5, 2007, pp. 1-5.

CMCC, "3GPP TSG-RAN WG1 #51, R1-074762", Nov. 5, 2007, pp. 1-2.

Samsung, "3GPP TSG RAN WG1 Meeting #50bis R1-074067", Oct. 8, 2007, pp. 1-12.

3rd Generation Partnership Project, "Technical Specification Group Radio Access Network; Evolved Universal Terrestrial Radio Access (E-UTRA); Physical channels and modulation (Release 8)", "3GPP TS 36.211 V8.0.0: Technical Specification", Sep. 2007, pp. 1-50.

Nokia Siemens Networks, et al., "Invariant PBCH Structure, R1-074861", "3GPP TSG RAN WG1 #51 Meeting, Jeju, Korea", Nov. 5-9, 2007, pp. 1-5.

Nokia Siemens Networks, et al., "Invariant PBCH Structure, R1-074307", "3GPP TSG RAN WG1 #50bis Meeting, Shanghai, China", Oct. 8-12, 2007, pp. 1-5.

Ericsson, "Summary of e-mail discussion on BCH physical-layer structure", "TSG-RAN WG1 49bis R1-073024", Jun. 25-29, 2007, pp. 1-4, Published in: Orlando, Florida, US.

Nokia Siemens Networks, Nokia, "On the multiplexing structure of the primary broadcast channel", "3GPP TSG RAN WG1 49bis Meeting R1-072962", Jun. 25-29, 2007, pp. 1-9, Published in: Orlando, Florida, US.

Nokia Siemens Networks, Nokia, "Primary BCH performance; coverage and detection", "3GPP TSG RAN WG1 49bis Meeting R1-072960", Jun. 25-29, 2007, pp. 1-6, Published in: Orlando, Florida, US.

Qualcomm Europe, "Structure of PBCH and Location of D-BCH", "3GPP TSG RAN1 49-bis R1-072728", Jun. 25-29, 2007, pp. 1-5, Published in: Orlando, Florida, US.

\* cited by examiner

METHOD FOR SENDING THE PHYSICAL BROADCAST CHANNEL IN A TIME DIVISION DUPLEX SYSTEM

CROSS-REFERENCE TO RELATED APPLICATIONS

This application is a U.S. national phase application under the provisions of 35 U.S.C. §371 of International Patent Application No. PCT/CN2008/072747 filed Oct. 17, 2008, which in turn claims priority of Chinese Patent Application No. 200710186456.1 filed Nov. 12, 2007. The disclosures of such international patent application and Chinese priority patent application are hereby incorporated herein by reference in their respective entireties, for all purposes.

FIELD OF THE INVENTION

The present invention relates to the field of mobile communication, in particular to a method for sending a physical broadcast channel in a Time Division Duplex system.

BACKGROUND OF THE INVENTION

FIG. 1 shows the frame structure of a Frequency Division Duplex (FDD for short) model in the Long Time Evolution (LTE for short). As shown in FIG. 1, in such a frame structure, a 10 ms radio frame is divided into two half frames, each half frame is partitioned into 10 time slots of 0.5 ms, and two time slots compose a subframe of 1 ms, thus one half frame comprises 5 subframes. When the cyclic prefix is a normal cyclic prefix, one time slot comprises 7 uplink/downlink symbols; when the cyclic prefix is an extended cyclic prefix, one time slot comprises 6 uplink/downlink symbols, and a Second-Synchronization Channel (S-SCH for short) and a Primary-Synchronization Channel (P-SCH for short) are arranged to be transmitted on the last two OFDM symbols of the first time slot. When the cyclic prefix is a normal cyclic prefix, the Physical Broadcast Channel (PBCH for short) is sent on the $4^{th}$ and $5^{th}$ OFDM symbols of the first time slot, and the 1st and $2^{nd}$ OFDM symbols of the second time slot; when the cyclic prefix is an extended cyclic prefix, the physical broadcast channel is sent on the $4^{th}$ OFDM symbol of the first time slot and the $1^{st}$, $2^{nd}$, and $3^{rd}$ OFDM symbols of the second time slot.

FIG. 2 shows the frame structure of the Time Division Duplex (TDD for short) model in the LTE system. As shown in FIG. 2, in such a frame structure, one radio frame of 10 ms is divided into two half frames, each half frame is partitioned into 10 time slots of 0.5 ms, and two time slots compose a subframe of 1 ms, thus one half frame comprises 5 subframes. When the cyclic prefix is a normal cyclic prefix, one time slot comprises 7 uplink/downlink symbols; when the cyclic prefix is an extended cyclic prefix, one time slot comprises 6 uplink/downlink symbols. As shown in FIG. 2, the subframe of such a frame structure has a configuration characteristic as follows:

Subframe 0 is fixedly used for downlink transmission;

Subframe 1 is a special subframe and comprises 3 special time slots respectively being a DwPTS (Downlink Pilot Time Slot), a GP (Guard Period) and an UpPTS (Uplink Pilot Time Slot), wherein the DwPTS is used for downlink transmission, the P-SCH is arranged to be sent on the first OFDM symbol of the DwPTS, and the S-SCH is arranged to be sent on the last OFDM symbol of the downlink time slot next to the DwPTS.

the GP is the Guard Period in which no data is transmitted.

the UpPTS is used for uplink transmission and comprises at least 2 uplink SC-FDMA symbols for transmitting the Physical Random Access Channel (PRACH for short).

From the aspects described hereinafter, it can be found that the method for sending the physical broadcast channel in the FDD is already unsuitable for sending the physical broadcast channel in the TDD.

The physical broadcast channel in the TDD requires more capacity than that in the FDD, thus the method for sending the physical broadcast channel in the FDD can not meet the physical broadcast channel capacity requirement in the TDD.

In order to use a synchronization signal for channel estimation in the FDD, the physical broadcast channel is configured to be sent before and after the synchronization signal. The sending positions of the synchronization signal are different due to the difference between the TDD frame structure and the FDD frame structure, thus the sending method in the FDD is unsuitable in the TDD.

The method for sending the physical broadcast channel in the FDD in case of the cyclic prefix being a normal cyclic prefix is different from that in case of the cyclic prefix being an extended cyclic prefix, which also increases the system complexity.

Therefore, it is desirable to design a new method for sending the physical broadcast channel aiming at the TDD frame structure.

SUMMARY OF THE INVENTION

Considering there is no suitable method for sending the physical broadcast channel in the TDD, the present invention provides a method for sending the physical broadcast channel in the TDD system to solve the above problem.

The present invention provides a method for sending the physical broadcast channel in the TDD system aiming at the TDD frame structure, which is mainly characterized in that:

The physical broadcast channel is sent in the middle 1.08 MHz of the whole frequency band, wherein a signal of a physical broadcast channel is not sent in a pilot position, no matter the cyclic prefix is a normal cyclic prefix or an extended cyclic prefix, the same sending method is utilized for the physical broadcast channel in the TDD; and the physical broadcast channel is sent on 4 OFDM symbols of the first subframe of one radio frame.

The physical broadcast channel is sent on 4 continuous OFDM symbols of the first subframe of one radio frame, the specific sending method has the following configurations:

The physical broadcast channel is sent on 4 continuous OFDM symbols of the first subframe of one radio frame, the specific sending method has the following configurations:

Manner 1
sent on the fifth last, fourth last, third last and second last OFDM symbols of the second time slot;

Manner 2
sent on the first, second, third and fourth OFDM symbols of the second time slot;

Manner 3
sent on the second last OFDM symbol, last OFDM symbol of the first time slot, and the first and second OFDM symbols of the second time slot;

Manner 4
sent on the sixth last, fifth last, fourth last and third last OFDM symbols of the second time slot;

Manner 5
sent on the last OFDM symbol of the first time slot, and the first, second and third OFDM symbols of the second time slot;

Manner 6 sent on the third last, second last and last OFDM symbols of the first time slot, and the first OFDM symbol of the second time slot; or, the physical broadcast channel can be sent on 4 discontinuous OFDM symbols of the first subframe of the radio frame, the specific sending method has the following configurations:

Manner 1 sent on the third last OFDM symbol of the first time slot, and the third last, the first and second OFDM symbols of the second time slot;

Manner 2 sent on the last, second last OFDM symbols of the first time slot, and the second last and the third OFDM symbol OFDM symbols of the second time slot.

All the above methods fully take advantage of the characteristics of the TDD frame structure, thus, they can be well applied in the TDD and meet the extension requirement of the physical broadcast channel capacity in the TDD. At the same time, the system complexity is reduced due to the normal cyclic prefix and extended cyclic prefix utilizing the same sending method.

BRIEF DESCRIPTION OF DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENTS

Functionality Overview

Figure 1:
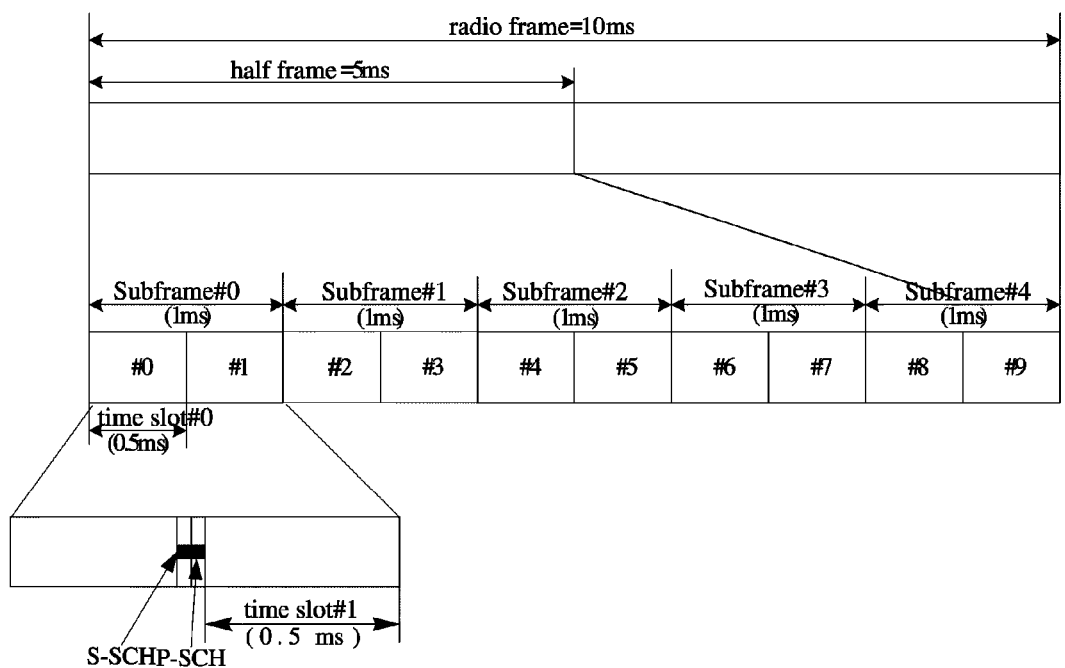
FIG. 1 is a schematic view of the frame structure of the FDD in the LTE system.
Figure 2:
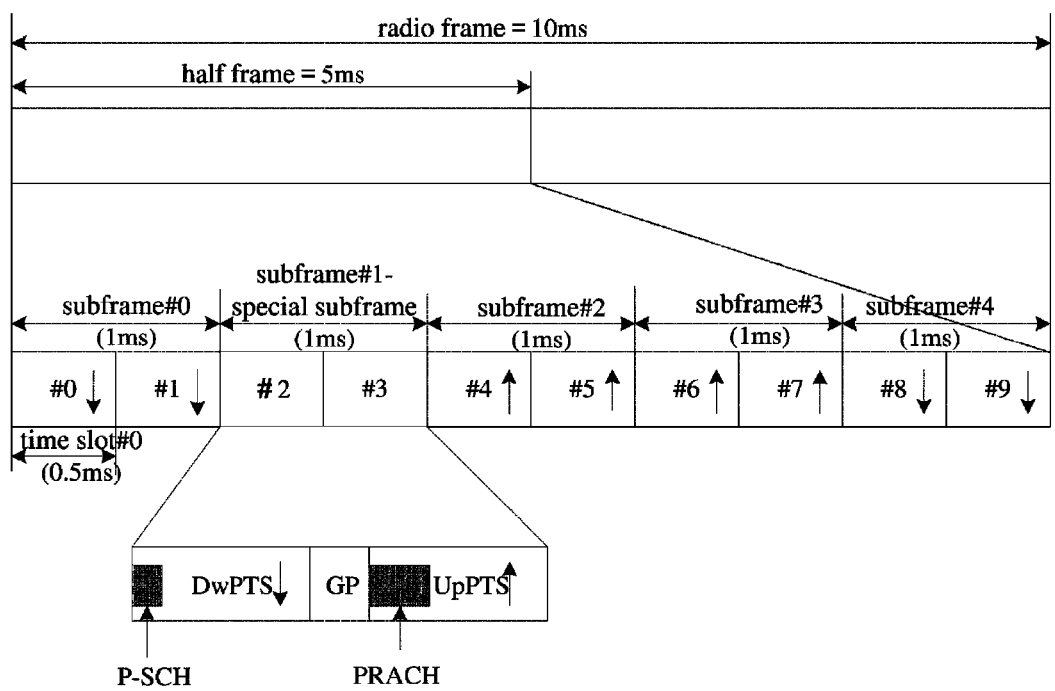
FIG. 2 is a schematic view of the frame structure of the TDD in the LTE system.

Considering that there is no suitable method for sending the physical broadcast channel in the TDD, in the technical scheme of the present embodiment, the physical broadcast channel is sent in the middle 1.08 MHz of the whole frequency band, wherein the signal of the physical broadcast channel is not sent in the pilot position, no matter the cyclic prefix is a normal one or an extended one, the same sending method is utilized for the physical broadcast channel in the TDD; and the physical broadcast channel is sent on 4 OFDM symbols of the first subframe of one radio frame, thus the above-mentioned problem is solved. The above technology scheme fully takes advantage of the characteristics of the TDD frame structure, and is capable of meeting the extension requirement of the physical broadcast channel capacity in the TDD. At the same time, the system complexity is reduced due to the normal cyclic prefix and extended cyclic prefix utilizing the same sending method.

In order to thoroughly understand the present invention, some concrete embodiments comprising the signal sending method according to the present invention are given in connection with FIGS. 3-12. Wherein, the physical broadcast channel occupies 1.08 MHz system frequency band centered at zero frequency in frequency domain, and the transmission location is at the first subframe of one radio frame. FIGS. 3-6 show the specific sending time of the physical broadcast channel in the first sub frame, wherein the first subframe comprises 2 time slots (the first time slot and the second time slot in the radio frame). When the cyclic prefix is a normal cyclic prefix, one time slot contains 7 symbols, when the cyclic prefix is an extended one, one time slot contains 6 symbols, and the S-SCH is sent on the last symbol of the first subframe. As shown in FIGS. 3-12, R1 denotes the pilot on the first antenna port, R2 denotes the pilot on the second antenna port, R3 denotes the pilot on the third antenna port, R4 denotes the pilot on the fourth antenna port, and the shadow part denotes the physical broadcast channel.

Figure 3:
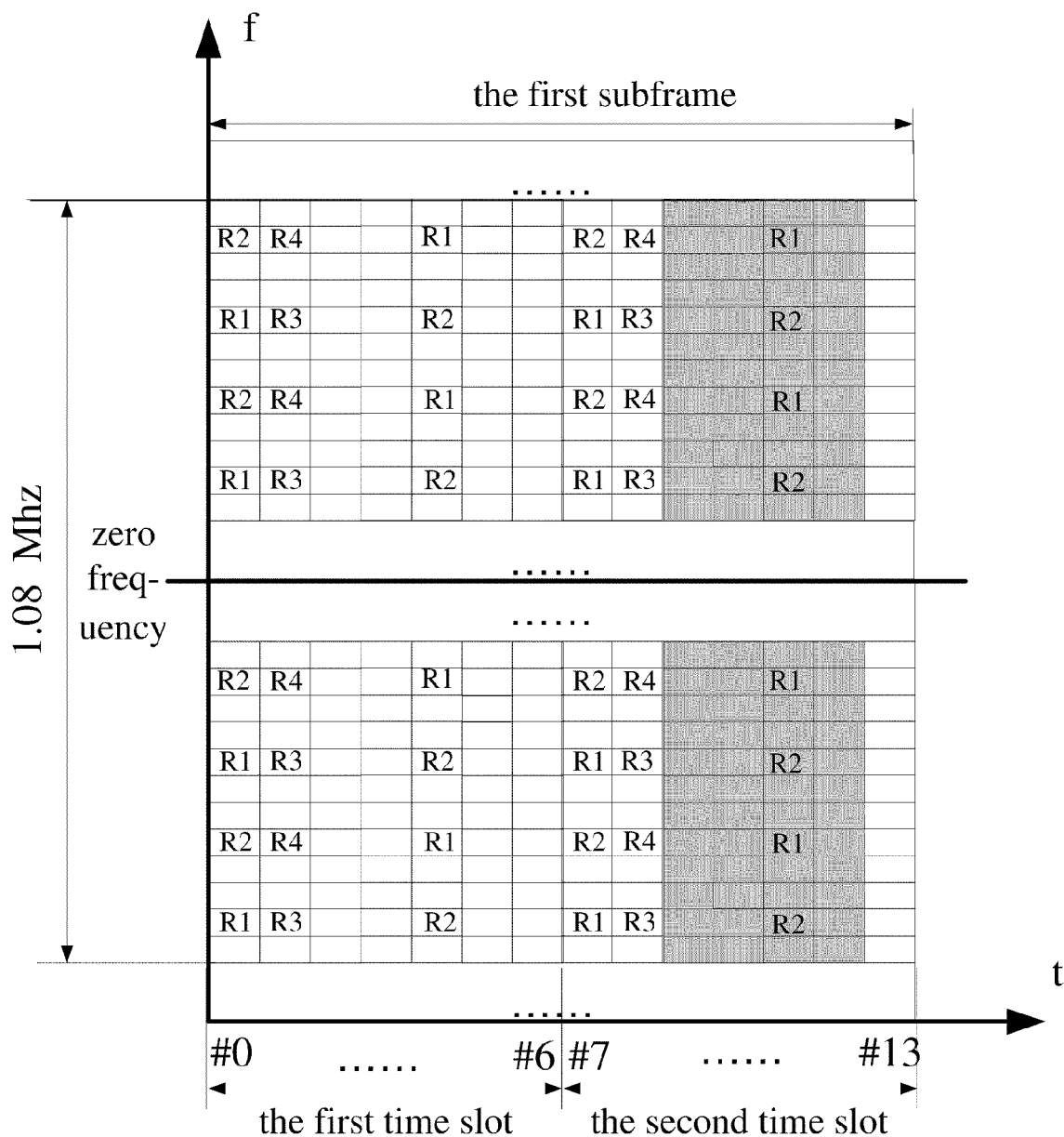
FIG. 3-FIG. 12 are schematic views of concrete sending embodiments for the physical broadcast channel in the TDD of the LTE system.

FIG. 3 is a schematic view of the sending embodiment for the physical broadcast channel in the TDD of the LTE system. In this embodiment, the cyclic prefix is a normal cyclic prefix, the physical channel is sent on the fifth last, fourth last, third last and second last OFDM symbols of the second time slot.

Figure 4:
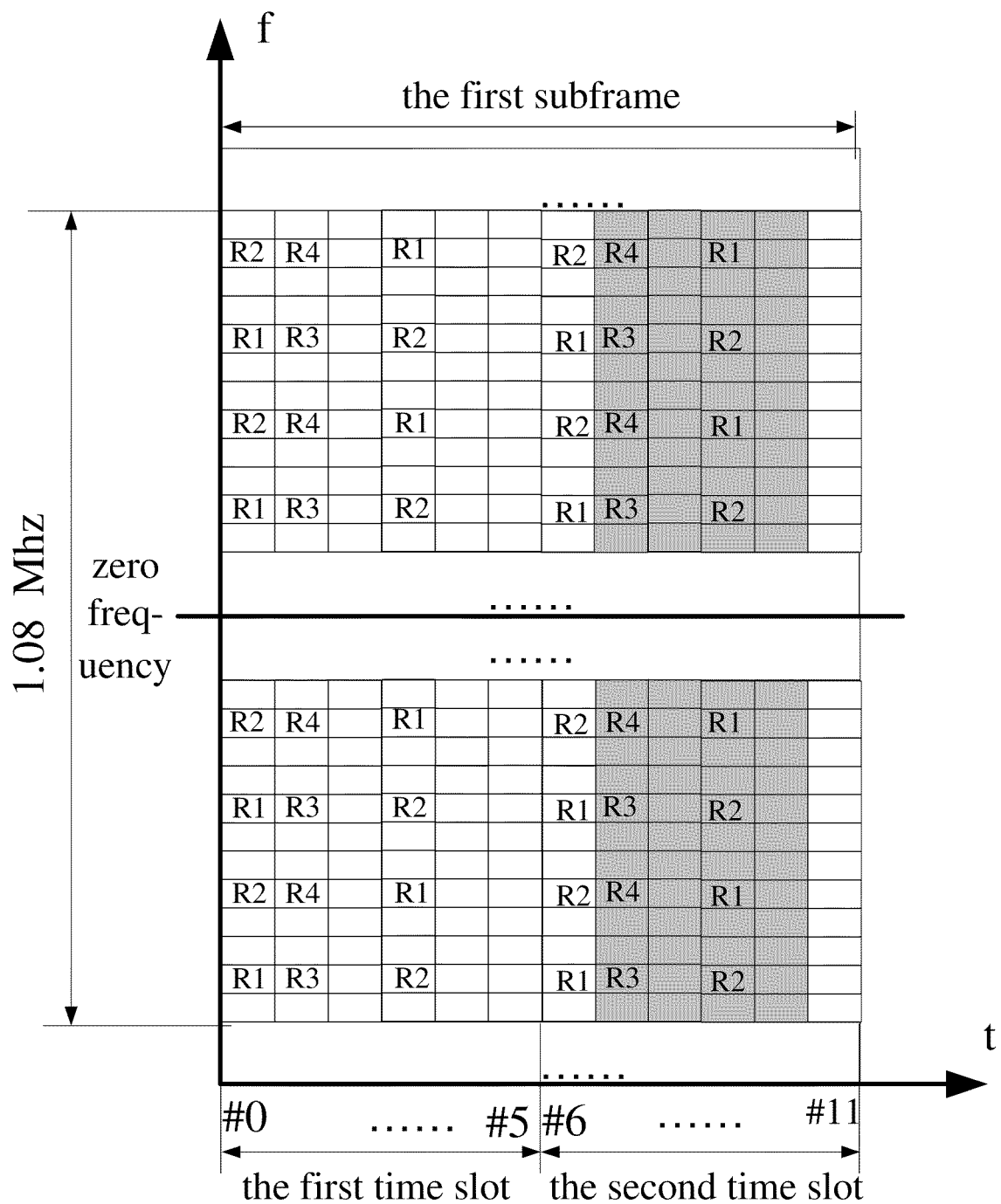

FIG. 4 is a schematic view of the sending embodiment for the physical broadcast channel in the TDD of the LTE system. In this embodiment, the cyclic prefix is an extended cyclic prefix, and the physical channel is sent on the fifth last, fourth last, third last and second last OFDM symbols of the second time slot.

Figure 5:
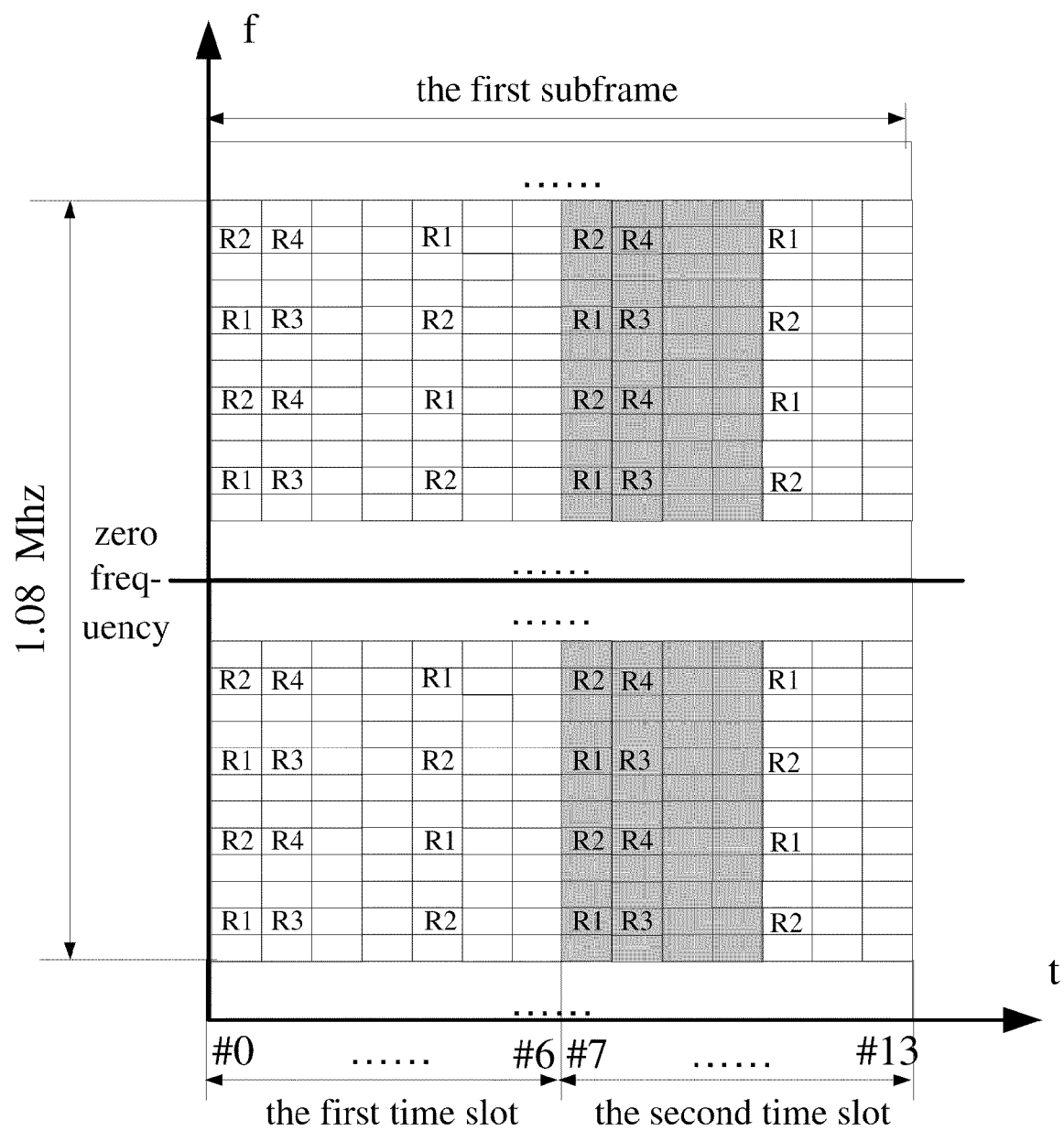

FIG. 5 is a schematic view of the sending embodiment for the physical broadcast channel in the TDD of the LTE system. In this embodiment, the cyclic prefix is a normal cyclic prefix, and the physical channel is sent on the first, second, third and fourth OFDM symbols of the second time slot.

Figure 6:
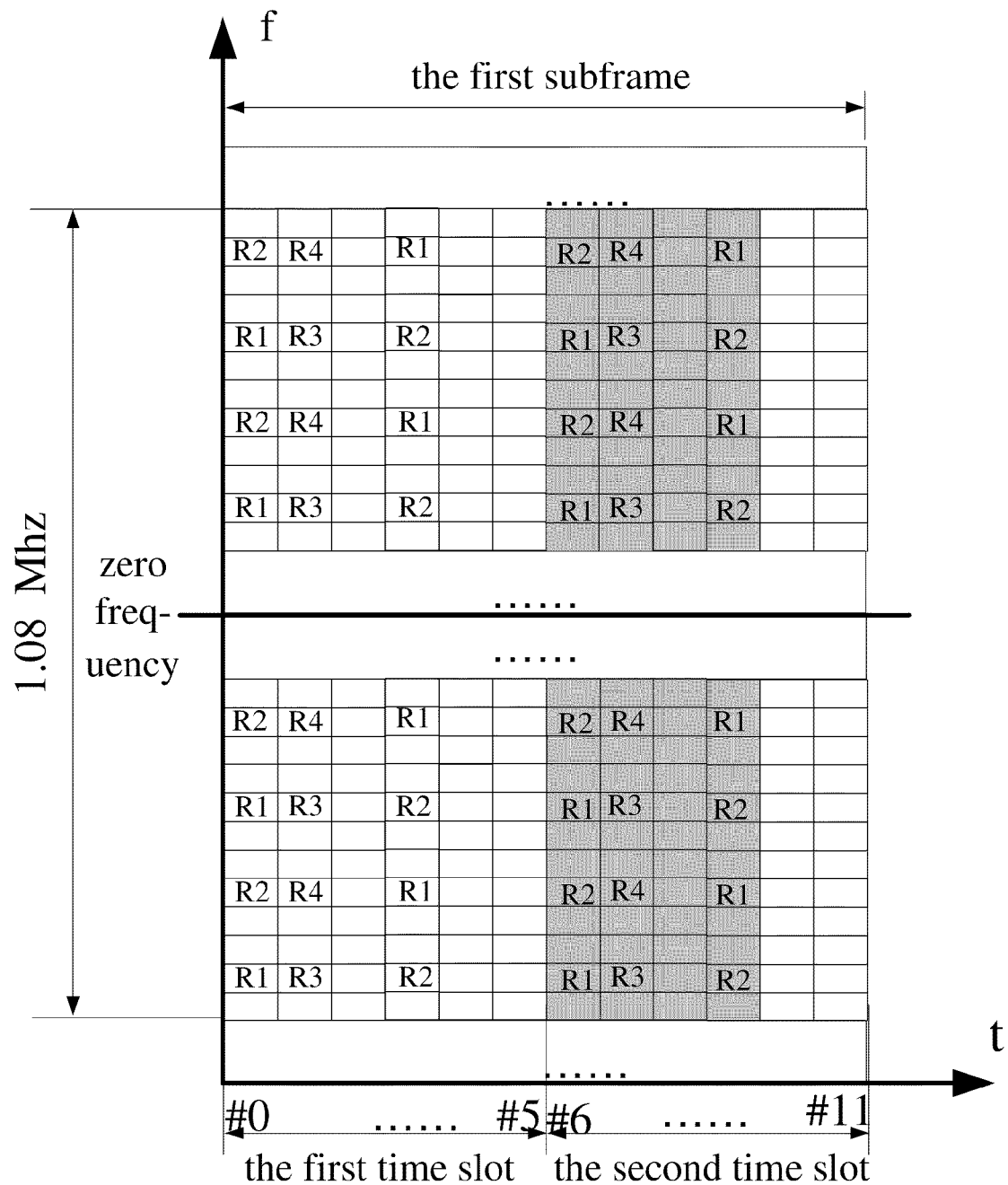

FIG. 6 is a schematic view of the sending embodiment for the physical broadcast channel in the TDD of the LTE system. In this embodiment, the cyclic prefix is an extended cyclic prefix, and the physical channel is sent on the first, second, third and fourth OFDM symbols of the second time slot.

Figure 7:
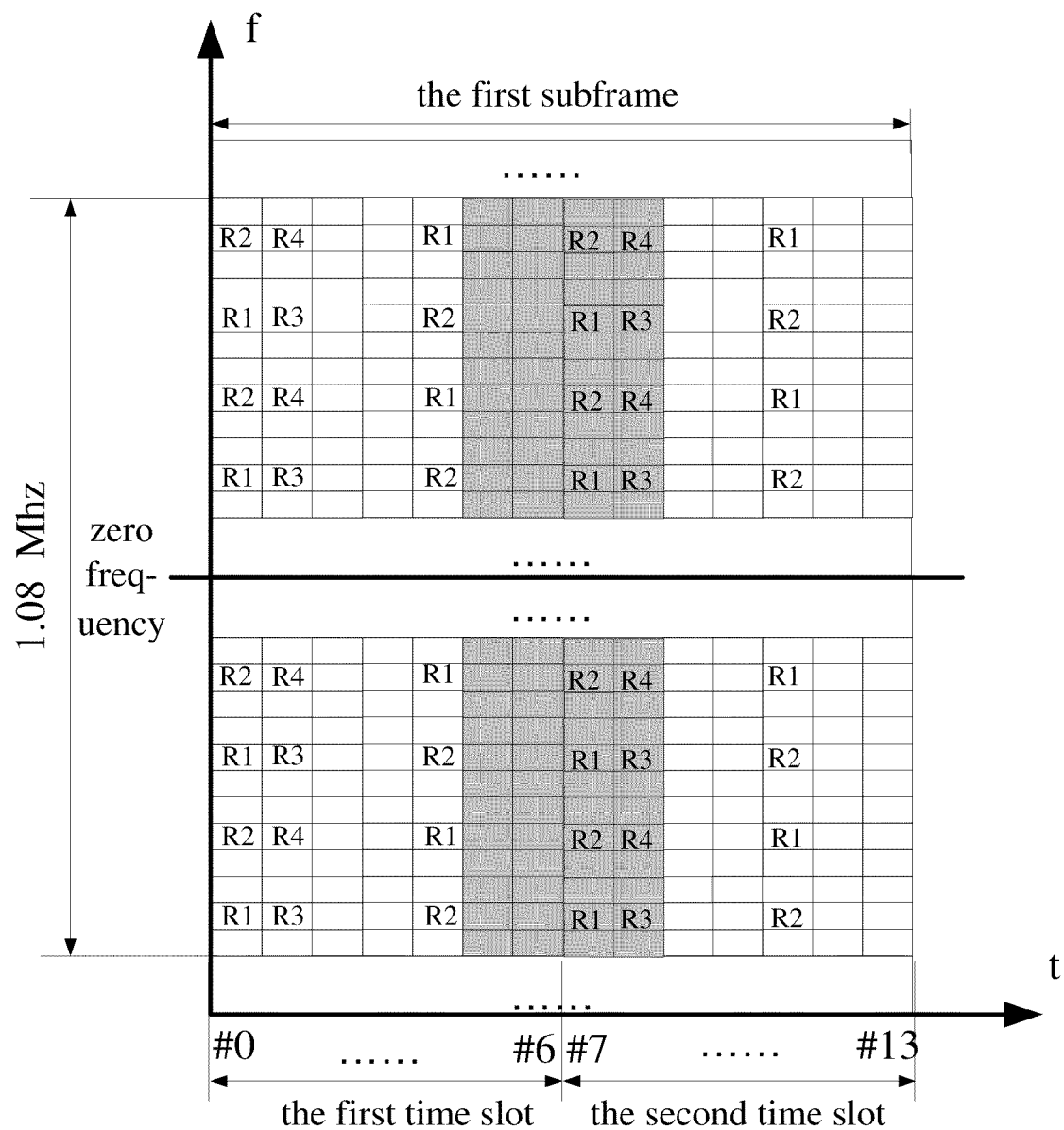

FIG. 7 is a schematic view of the sending embodiment for the physical broadcast channel in the TDD of the LTE system. In this embodiment, the cyclic prefix is a normal cyclic prefix, the physical channel is sent on the second last and last OFDM symbols of the first time slot, and the first and second OFDM symbols of the second time slot.

Figure 8:
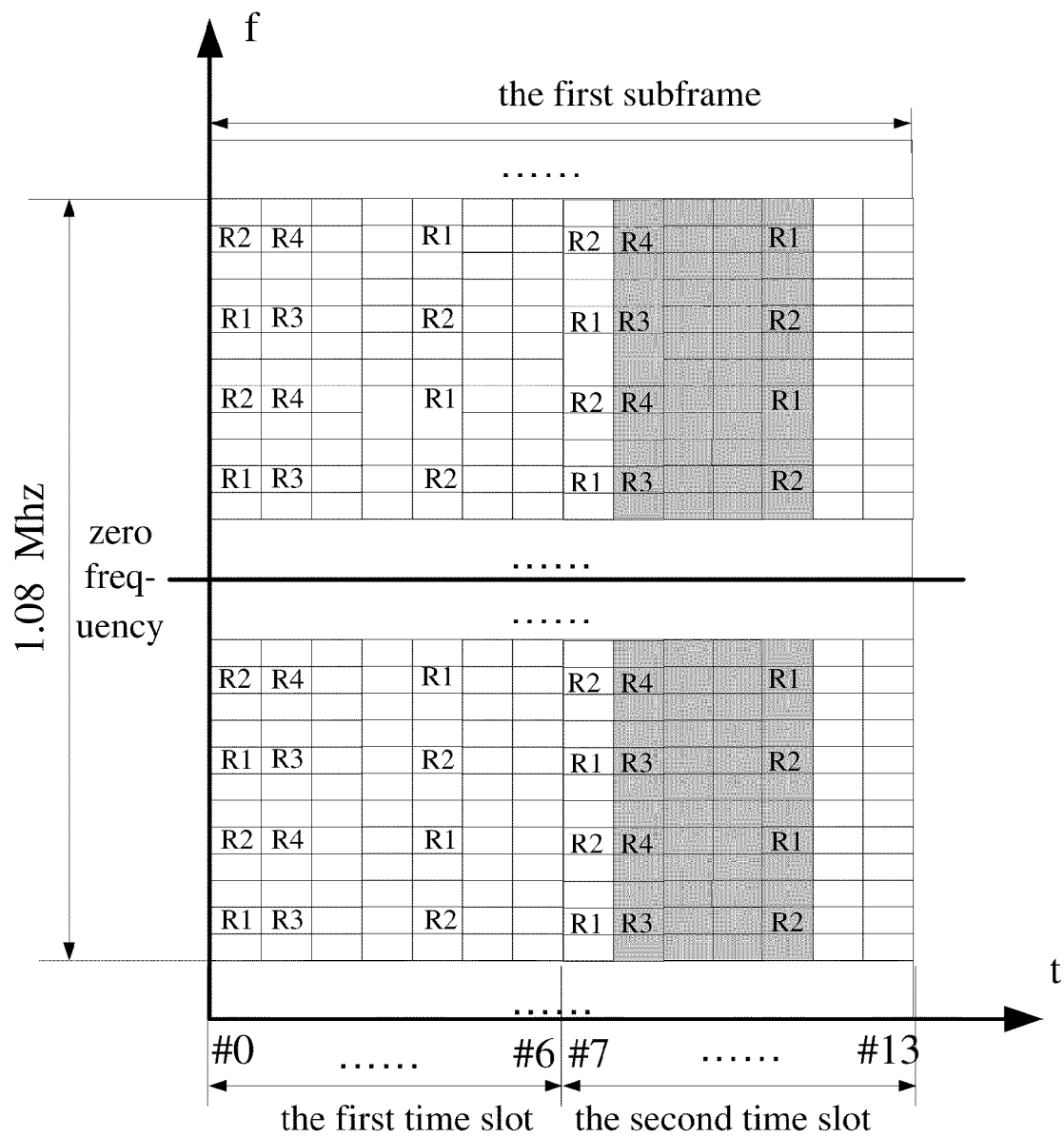

FIG. 8 is a schematic view of the sending embodiment for the physical broadcast channel in the TDD of the LTE system. In this embodiment, the cyclic prefix is a normal cyclic prefix, the physical channel is sent on the sixth last, fifth last, fourth last and third last OFDM symbols of the second time slot.

Figure 9:
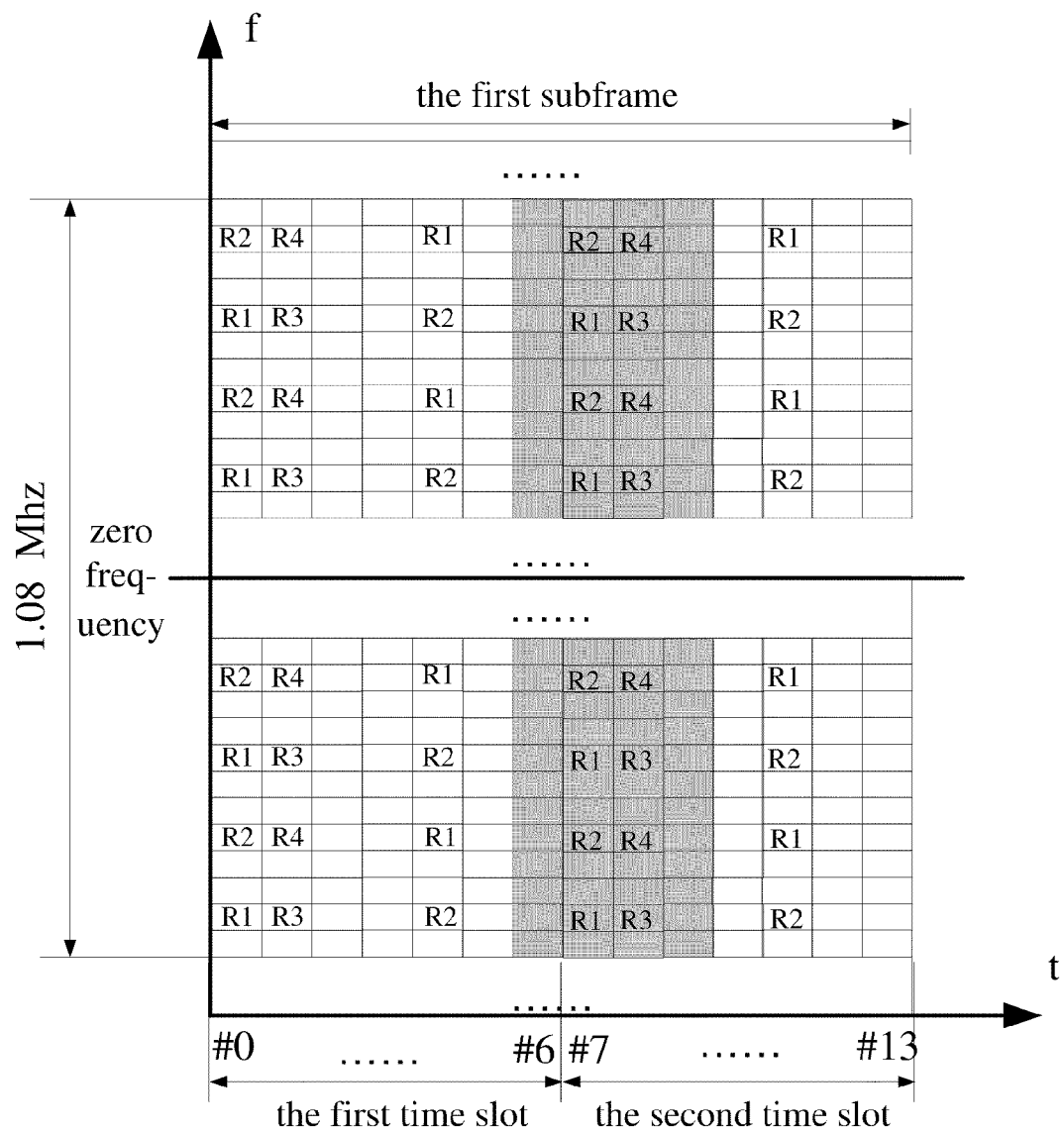

FIG. 9 is a schematic view of the sending embodiment for the physical broadcast channel in the TDD of the LTE system. In this embodiment, the cyclic prefix is a normal cyclic prefix, the physical channel is sent on the last OFDM symbol of the first time slot, and the first, second and third OFDM symbols of the second time slot.

Figure 10:
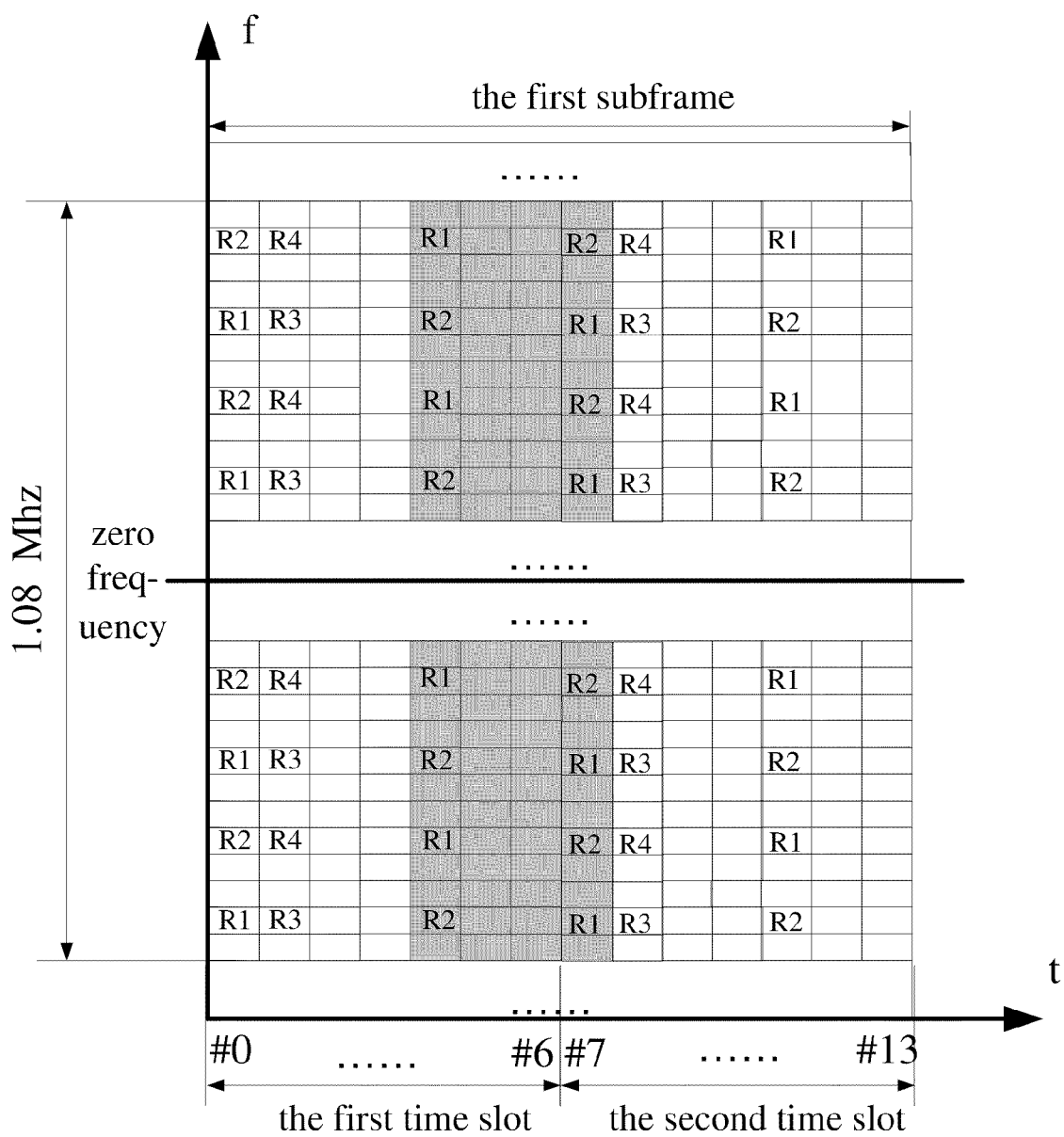

FIG. 10 is a schematic view of the sending embodiment for the physical broadcast channel in the TDD of the LTE system, In this embodiment, the cyclic prefix is a normal cyclic prefix, the physical channel is sent on the third last, second last and last OFDM symbols of the first time slot, and the first OFDM symbol of the second time slot.

Figure 11:
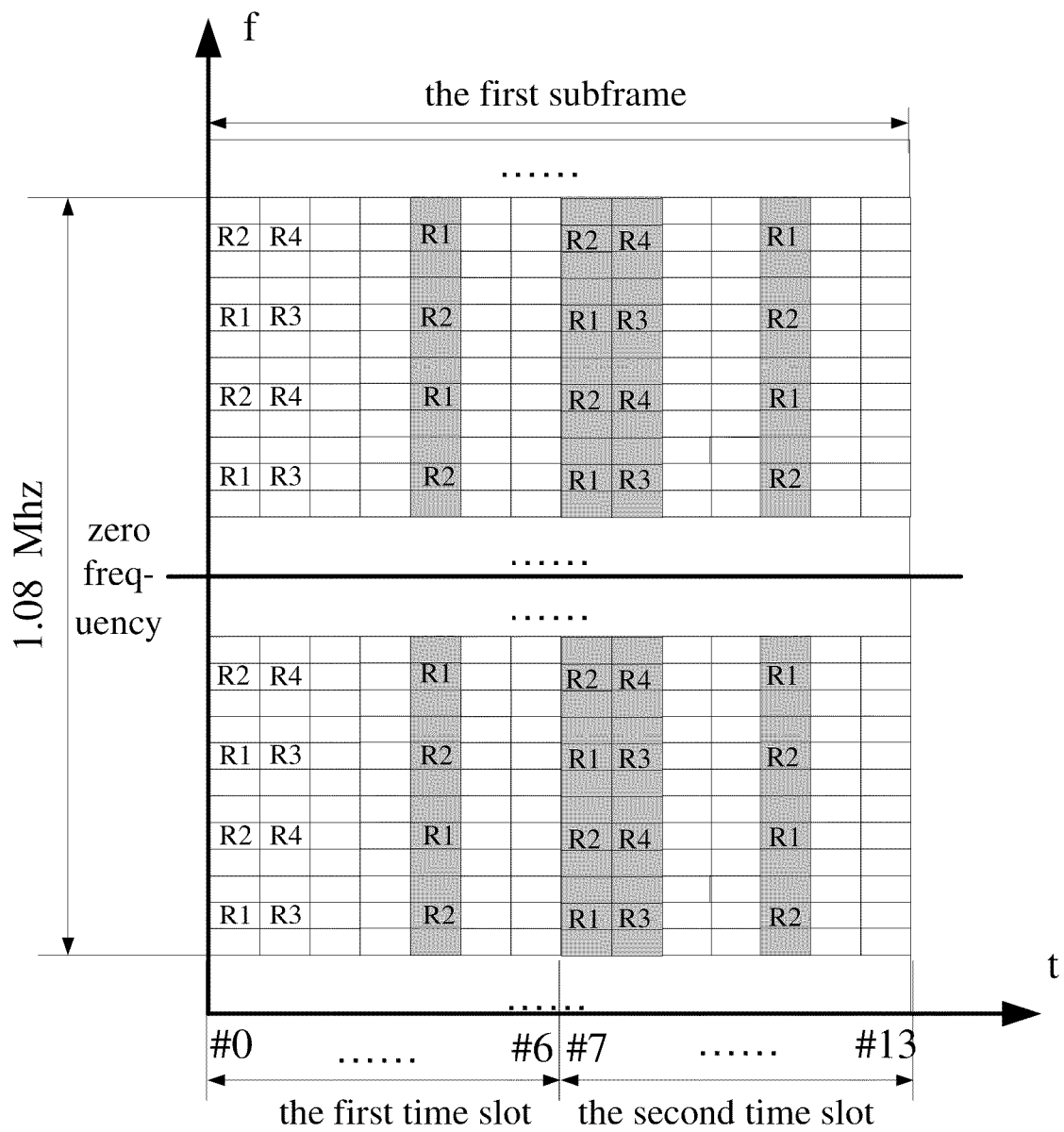

FIG. 11 is a schematic view of the sending embodiment for the physical broadcast channel in the TDD of the LTE system. In this embodiment, the cyclic prefix is a normal cyclic prefix, the physical channel is sent on the third last OFDM symbol of the first time slot, and the first, second and the third OFDM symbols of the second time slot.

Figure 12:
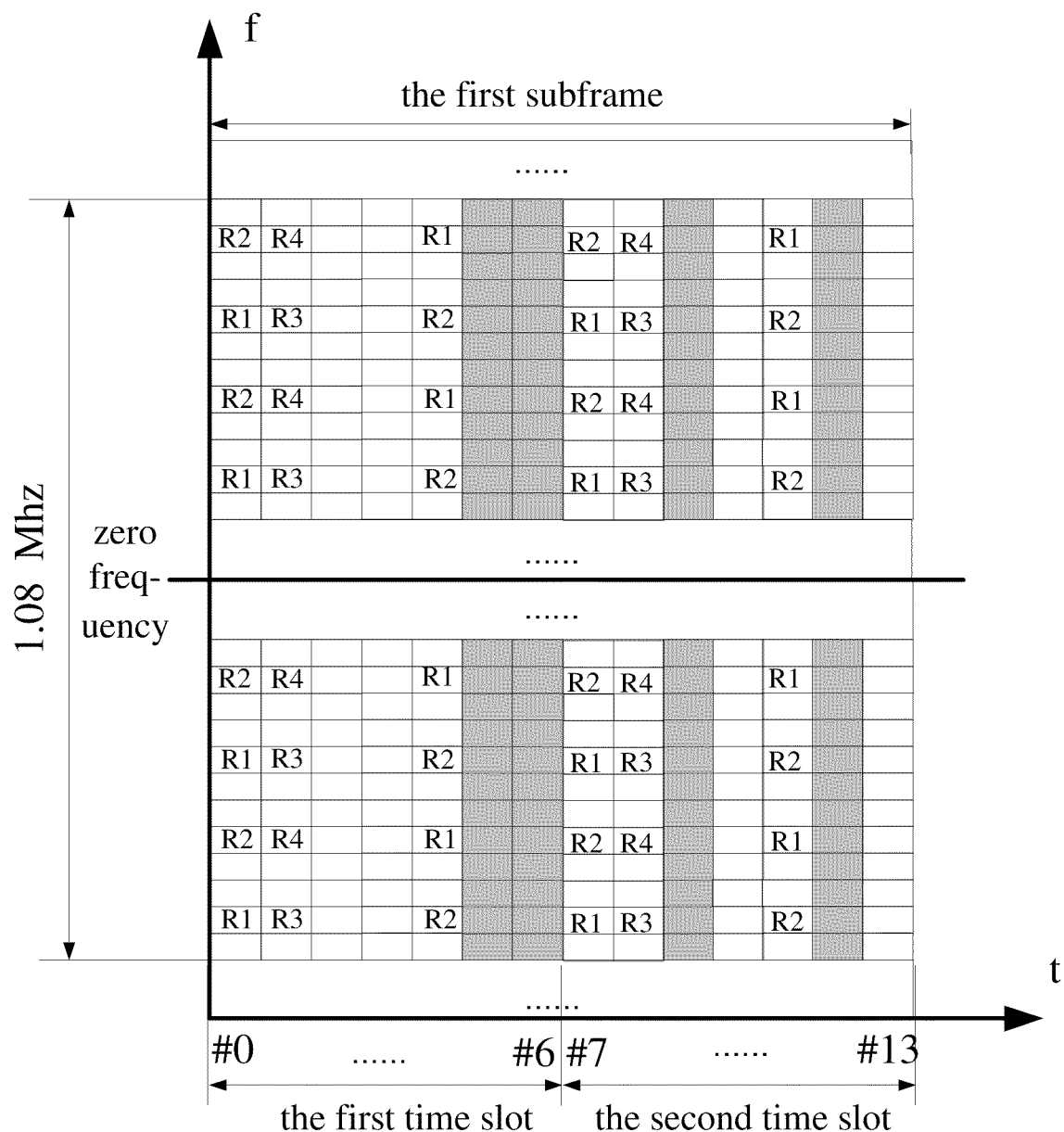

FIG. 12 is a schematic view of the sending embodiment for the physical broadcast channel in the TDD of the LTE system. In this embodiment, the cyclic prefix is a normal cyclic prefix, the physical channel is sent on the last and the second last OFDM symbols of the first time slot, and the second last and the third OFDM symbols of the second time slot.

Based on above description, the present invention sends the physical broadcast channel in the middle 1.08 MHz of the whole frequency band, wherein the signal of the physical broadcast channel is not sent in the pilot position, no matter the cyclic prefix is a normal one or an extended one, the same sending method is utilized for the physical broadcast channel in the TDD; and the physical broadcast channel is sent on 4 OFDM symbols of the first subframe of one radio frame, thus the above-mentioned problem is solved. The above technical scheme fully takes advantage of the characteristics of the TDD frame structure, and is capable of meeting the extension requirement of the physical broadcast channel capacity in the TDD. At the same time, the system complexity is reduced due to the normal cyclic prefix and extended cyclic prefix utilizing the same sending method.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for sending the physical broadcast channel in an LTE TDD system, wherein:

a signal of a physical broadcast channel is not sent in a pilot position, and the signal of the physical broadcast channel is sent on four consecutive OFDM symbols of the first subframe of one radio frame in the LTE TDD system and the entire physical broadcast channel is situated on one side of the synchronization channel (SCH);

wherein when the cyclic prefix of the radio frame is a normal cyclic prefix or an extended cyclic prefix, the physical broadcast channel is sent on the following four consecutive OFDM symbols of the first subframe of the radio frame:

the fifth last, fourth last, third last and second last OFDM symbols of the second time slot; or the first, second, third and fourth OFDM symbols of the second time slot; or the sixth last, fifth last, fourth last and third last OFDM symbols of the second time slot.

2. The method according to claim 1, wherein the physical broadcast channel is sent in the middle 1.08 MHz of the whole frequency band.

3. The method according to claim 1, wherein the radio frame with the normal cyclic prefix and the radio frame with the extended cyclic prefix use the same method for sending the physical broadcast channel.

* * * * *